(No Model.)

C. HIRSCH.
HOSE NOZZLE.

No. 570,757. Patented Nov. 3, 1896.

WITNESSES:

INVENTOR
C. Hirsch
BY
ATTORNEYS

UNITED STATES PATENT OFFICE.

CHARLES HIRSCH, OF BUFFALO, NEW YORK, ASSIGNOR OF ONE-HALF TO SAMUEL L. ALTMAN, OF SAME PLACE.

HOSE-NOZZLE.

SPECIFICATION forming part of Letters Patent No. 570,757, dated November 3, 1896.

Application filed January 2, 1896. Serial No. 574,065. (No model.)

*To all whom it may concern:*

Be it known that I, CHARLES HIRSCH, of Buffalo, in the county of Erie and State of New York, have invented a new and Improved Hose-Nozzle, of which the following is a full, clear, and exact description.

This invention relates to certain improvements in hose-nozzles, and has for its object to provide a nozzle of this general character of a simple and inexpensive construction, which shall be provided with means whereby the flow of the water may be controlled in a simple and effective way to regulate the discharge of the water and whereby the nozzle is adapted for throwing either a plain stream of water or for use in spraying, the nozzle being also provided with means of a simple and convenient nature for cutting off the flow of water entirely.

The invention contemplates certain novel features of the construction, combination, and arrangement of the various parts of the improved nozzle, whereby certain important advantages are attained and the device is made simpler, cheaper, and otherwise better adapted and more convenient for use than various other similar devices heretofore employed, all as will be hereinafter fully set forth.

The novel features of the invention will be carefully defined in the claim.

Reference is to be had to the accompanying drawings, forming a part of this specification, in which similar characters of reference indicate corresponding parts in both views.

Figure 1:
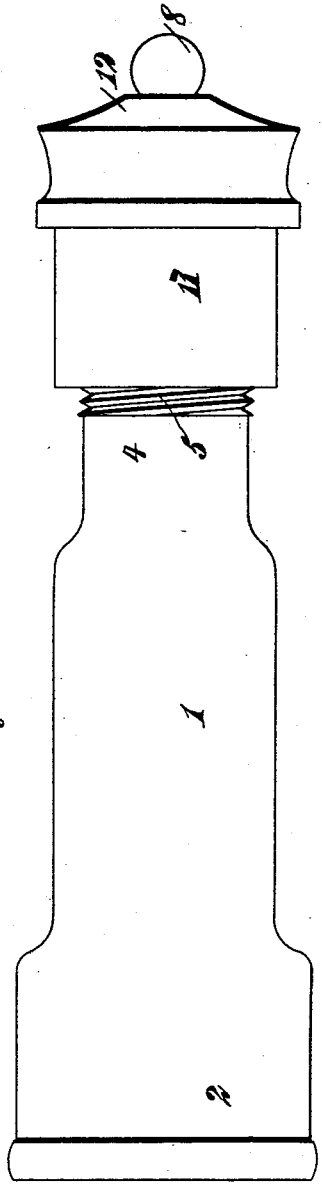
Figure 2:
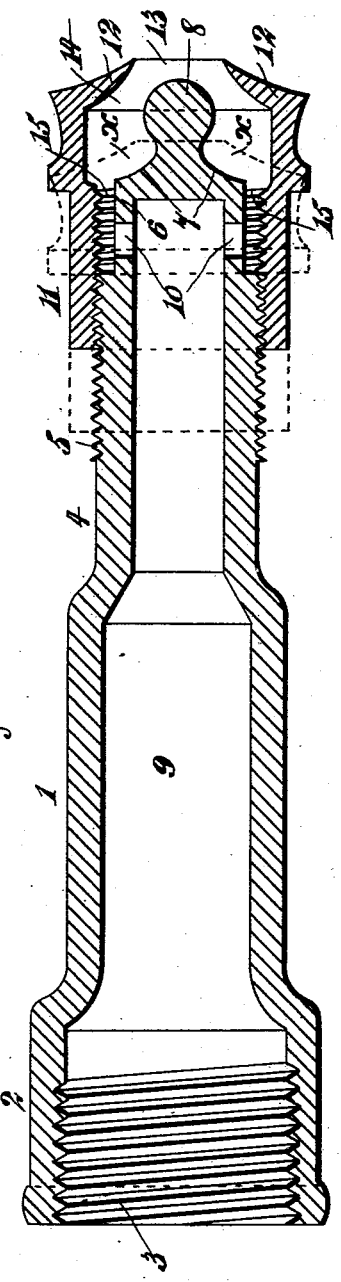

Figure 1 is a side elevation of a nozzle constructed in accordance with my invention, and Fig. 2 is a section taken axially through the same.

In the views, 1 indicates the body of the nozzle, of cylindrical or rounded form, having an enlarged portion 2 formed at one end, the opposite end 4 of the nozzle being reduced and exteriorly screw-threaded, as indicated at 5. The body of the nozzle is hollow or tubular throughout its entire length, and the larger portion 2 thereof is interiorly screw-threaded, as indicated at 3.

Beyond the reduced screw-threaded end portion 5 of the body 1 is formed an extension 6, also of circular or cylindrical form, having a lesser diameter than the reduced portion 5, and having its end closed and formed with an annular valve-seat 7 therein, from the center of which projects a spherical lug or ball 8, integrally formed on the end of the body, as clearly indicated in Fig. 2. 9 indicates the passage formed through the body 1 and adapted to convey water from a suitable supply, for example, a hose screwed into the enlarged end 2 of the body, and said passage 9 is in communication, by means of lateral openings 10, formed through the walls of the extension 6 at the end of the body, with the outer side of said body.

On the screw-threaded portion 5 of the body screws a tip or nipple 11, having at its end an annular inturned flange 12, forming a central opening 13 at said end and of less diameter than the interior diameter of the tip or nipple, said flange 12 having its inner surface shaped to fit the valve-seat formed on the end of the extension 6 of the body when the nipple 11 is screwed up on the body, as indicated in dotted lines at $x$ in Fig. 2. Between the outer surface of the extension 6 of the body and the inner surface of the tip or nipple 11 is formed an annular chamber 15, which receives water through the openings 10 in the walls of said extension from the passage 9.

In operation, when it is desired to employ the device as an ordinary hose-nozzle to throw a plain stream of water, the nipple 11 is turned until it assumes the position shown in full lines in Fig. 2, so that the edge of the inwardly-projecting flange 12 of the nipple is beyond or outside of the ball or lug 8 on the end of the body; and when it is desired to employ the device as a spray-nozzle said nipple or tip is turned until the edge of the flange 12 assumes a position substantially opposite the center of the said ball or lug 8, which, as will be readily understood by inspection of the drawings, is located centrally with respect to the opening 13 in the end of the nipple.

When it is desired to entirely cut off the flow of water through the nozzle, the nipple is screwed up to the position indicated in dotted lines in Fig. 2 and seen in full lines in Fig. 1, the valve 14 on the nipple being then in contact with the valve-seat 7 on the end of the extension 6 of the body, so as to form a close joint to prevent the flow of water from the chamber 15 through the opening 13.

From the above description it will be seen that my improved nozzle is of an extremely simple and inexpensive construction and is well adapted for the purposes for which it is intended, since it is readily adjustable so as to accommodate it for use either as an ordinary hose-nozzle or as a spray-nozzle, and it will also be obvious from the above description that the device is susceptible of considerable modification without material departure from the principles and spirit of the invention, and for this reason I do not wish to be understood as limiting myself to the exact construction as herein shown.

Having thus described my invention, I claim as new and desire to secure by Letters Patent—

In a nozzle, the combination with a tubular body having a screw-threaded end portion and provided with a reduced integral extension beyond said screw-threaded portion, said extension having its outer end beveled or inclined inward at the edges forming a valve-seat, and a spherical lug projecting centrally from said end, of a nipple adjustable on the screw-threaded portion of the body and having an opening of greater diameter than the reduced extension whereby a space is formed for the passage of the water, the said space being connected by openings with the interior of the tubular body, the said nipple being formed at its outer end with an annular inwardly-projecting flange having a forward inclination and tapering toward its margin forming a central exit-opening for the water and through which the said spherical lug of the extension is adapted to pass, the inclined inner face of said flange being shaped to correspond with the valve-seat on the said reduced extension and adapted when the nipple is moved inward to engage the said valve-seat and cut off the flow of water, substantially as set forth.

CHARLES HIRSCH.

Witnesses:
N. OSBORNE GREEN,
DE WITT CLINTON.